United States Patent [19]

Staehle et al.

[11] Patent Number: 4,828,707

[45] Date of Patent: * May 9, 1989

[54] APPARATUS FOR IMPROVING THE SEPARATION OF FLUIDS OF DIFFERENT DENSITIES

[75] Inventors: Bruce E. Staehle, Buffalo Grove; David L. Holbrook, Palatine, both of Ill.

[73] Assignee: UOP, Des Plaines, Ill.

[*] Notice: The portion of the term of this patent subsequent to Jan. 5, 2005 has been disclaimed.

[21] Appl. No.: 110,167

[22] Filed: Oct. 19, 1987

Related U.S. Application Data

[63] Continuation-in-part of Ser. No. 889,997, Jul. 28, 1986, Pat. No. 4,717,481.

[51] Int. Cl.$^4$ .............................................. B01D 17/02
[52] U.S. Cl. ..................................... 210/649; 210/265
[58] Field of Search ............... 210/649, 265, 307, 634, 210/247

[56] References Cited

U.S. PATENT DOCUMENTS 4,717,481 1/1988 Staehle et al. ...................... 210/649

Primary Examiner—Frank Spear
Attorney, Agent, or Firm—Thomas K. McBride; John G. Tolomei; John G. Cutts, Jr.

[57] ABSTRACT

An apparatus is disclosed for improving the separation of fluids having different densities which apparatus employs a velocity reducing distributor for directing fluids in a vertical direction through a bed of packing to coalesce the fluids and a means to alter the direction of flow of the coalesced fluids to a horizontal direction. The disclosed apparatus is of particular advantage with respect to the gravitational separation of fluids having different densities which comprise an aqueous phase and a hydrocarbonaceous phase.

17 Claims, 1 Drawing Sheet

APPARATUS FOR IMPROVING THE SEPARATION OF FLUIDS OF DIFFERENT DENSITIES

CROSS REFERENCE TO RELATED APPLICATIONS

This application is a continuation-in-part of application Ser. No. 889,997, filed July 28, 1986 now U.S. Pat. No. 4,717,481, all the teachings of which are hereby incorporated by reference.

BACKGROUND OF THE INVENTION

The field of art to which the present invention relates is apparatus to improve the separation of fluids having different densities. In particular, the present invention pertains to an apparatus which facilitates the separation of two fluids having different densities. More specifically, the invention relates to a separation apparatus utilized to improve the gravitational separation of fluids having different densities, the apparatus comprising: (a) a separator vessel; (b) a fluid entry means connected to an opening into the separator vessel; (c) a fluid distribution means mounted upon the terminus of the fluid entry means within the separator vessel; (d) the fluid distribution means including at least one aperture whereby the fluids are dispersed within the separator vessel; (e) an elongated chamber which is vertically oriented and having imperforate sides and bottom, and encompasses and is in fluid communication with the fluid distribution means; (f) a slotted chamber which is coextensive and in fluid communication with an upper end of the elongated chamber; (g) the slotted chamber having an imperforate upper end plate; and (h) packing means disposed in at least a portion of the elongated chamber, the cross-sectional area of slots of the slotted chamber being sufficient with respect to the available flowing cross-sectional area of the resulting packed bed of the elongated chamber, to prevent an increase in the velocity of the fluids to improve the gravitational separation of the fluids having different densities.

INFORMATION DISCLOSURE

Various types of industrial devices are employed to effect uniform distribution of fluids being introduced into contacters, separators, and the like.

Heretofore, for example, when it has been desired to separate mixtures of fluids of varying densities, it has been common to introduce the admixed fluids into a vessel and by the passage of time, allow the admixture to separate into a fluid having a low density and a fluid having a high density.

It has been observed by those skilled in the art that when a stream of fluids of different densities is introduced into a calm pool of fluid maintained in a vessel, some turbulence results. The amount of turbulence created depends upon many factors including the velocity of the entering fluid stream, the kinetic energy of the entering fluid stream and the like.

When operating on a continuous basis, the introduction of a fluid stream of such material into a quantity of like fluid undergoing phase separation, turbulence often occurs to such an extent that the fluid of higher density passes upwardly into the fluid of light density and leaves the top of the vessel as a readmixture of the fluids. Obviously, such a result is unsatisfactory when one is attempting to effect a sharp separation of fluids of different densities.

In an attempt to overcome this problem, a number of devices have been fabricated for mounting on the end or terminus of the entry pipe within the separation vessel in order to modify such factors as kinetic energy, inflow velocity and similar related factors of the entering fluid to permit an effective separation of the fluids into components of different densities.

One such device consisted of four pipes extending radially from a central inlet pipe. The bottom half of each of the four pipes was cut away to provide a flow path for the entering fluids. Unfortunately, when this device was used, it was discovered that the fluid exiting the pipes impinged upon the inner vessel wall and caused such extensive turbulence that "carryover" of the fluid of higher density resulted.

Another device consisted of vertical slotted pipes fitted with caps on the open end, each pipe being mounted on the end of four pipes extending radially from a central entry pipe. When fluid was introduced through the device, it was found that the fluid stream exited through the slots in the pipes only at the end closest to the end caps and again cause extensive turbulence whereby "carryover" of the heavy density fluid from the vessel resulted.

Another inlet device is disclosed in U.S. Pat. No. 4,479,875 (Nelson) which device is provided with fluid openings having packing means disposed thereabout.

It should be noted that, in contrast to the apparatus for improving the separation of fluids of different densities of the present invention, the distributors for liquid-liquid distribution do not employ a velocity reducng distributor for directing fluids in a vertical direction through a bed of packing to coalesce the fluids and a means to alter the direction of flow of the coalesced fluids to a horizontal direction.

The present invention provides a novel separation apparatus to effect rapid and complete separation of a stream of fluids having different densities. Utilization of this separation apparatus results in a sharp, clear separation of such fluids when a stream of the same is introduced into the separation apparatus.

BRIEF SUMMARY OF THE INVENTION

The invention provides a novel separation apparatus to effect rapid and complete separation of a stream of fluids having different densities.

One embodiment of the invention may be characterized as a separation apparatus to improve the gravitational separation of fluids having different densities, said apparatus comprising: (a) a separator vessel; (b) a fluid entry means connected to an opening into the separator vessel; (c) a fluid distribution means mounted upon the terminus of the fluid entry means within the separator vessel; (d) the fluid distribution means including at least one aperture whereby the fluids are disposed within the separator vessel; (e) an elongated chamber which is vertically oriented and having imperforate sides and bottom, and encompasses and is in fluid communication with the fluid distribution means; (f) slotted chamber which is coextensive and in fluid communication with an upper end of the elongated chamber; (g) the slotted chamber having an imperforate upper end plate; and (h) packing means disposed in at least a portion of the elongated chamber, the cross-sectional area of slots of the slotted chamber being sufficient with respect to the available flowing cross-sectional area of the resulting packed bed of the elongated chamber, to prevent an increase in the velocity of the fluids to improve the gravitational separation of the fluids having different densities.

Another embodiment of the invention may be characterized as a process for gravitationally separating fluids having different densities wherein said fluids are passed to a separation apparatus comprising: (a) a separator vessel; (b) a fluid entry means connected to an opening into the separator vessel; (c) a fluid distribution means mounted upon the terminus of the fluid entry means within the separator vessel; (d) the fluid distribution means including at least one aperture whereby the fluids are dispersed within the separator vessel; (e) an elongated chamber which is vertically oriented and having imperforate sides and bottom, and encompasses and is in fluid communication with the fluid distribution means; (f) a slotted chamber which is coextensive and in fluid communication with an upper end of the elongated chamber; (g) the slotted chamber having an imperforate upper end plate; and (h) packing means disposed in at least a portion of the elongated chamber, the cross-sectional area of slots of the slotted chamber being sufficient with respect to the available flowing cross-sectional area of the resulting packed bed of the elongated chamber, to prevent an increase in the velocity of the fluids to improve the gravitational separation of the fluids having different densities.

Yet another embodiment of the invention may be characterized as a method for gravitationally separating an admixture of naphtha and an aqueous alkaline solution which method comprises the steps of: (a) passing the admixture of naphtha and an aqueous alkaline solution into a separation zone; (b) distributing the admixture to provide a generally upflowing vertical stream of the admixture having a reduced velocity; (c) contacting the upflowing stream with a bed of packing wherein separate fluid phases of naphtha and aqueous alkaline solution are coalesced; (d) altering the direction of flow of the separate fluid phases of naphtha and aqeuous alkaline solution to a generally horizontal flow; (e) passing the separate fluid phases of naphtha and aqueous alkaline solution through slotted apertures having a combined cross-sectional area sufficient to ensure complete coalescence without increasing the velocity of the separate fluid phases of naphtha and aqueous alkaline solution; and (f) recovering the separate fluid phases.

Other embodiments of the present invention encompass further details such as preferred mechanical components and design details, all of which are hereinafter disclosed in the following discussion of each of these facets of the invention.

BRIEF DESCRIPTION OF THE DRAWING

The drawing is presented in illustration of one preferred embodiment of the invention and is not intended as an undue limitation on the generally broad scope of the invention as set out in the appended claims.

DETAILED DESCRIPTION OF THE INVENTION

Figure 1:
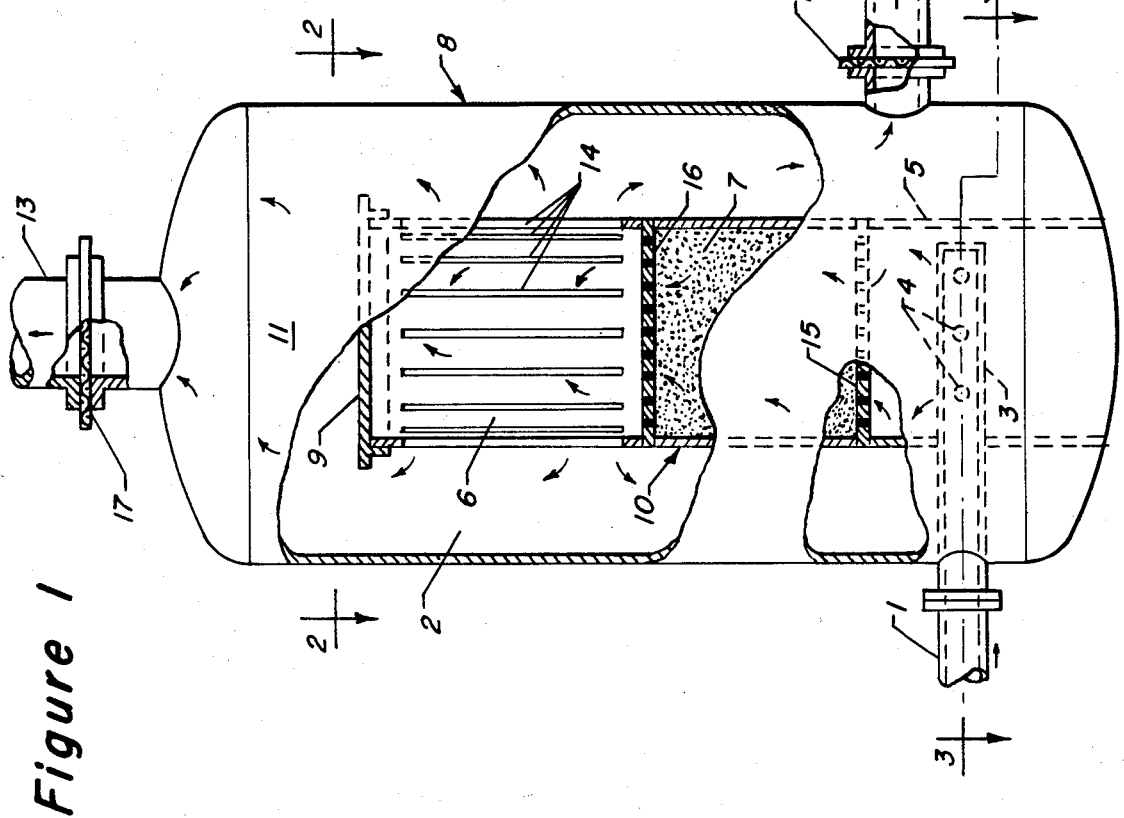
FIG. 1 of the drawing represents a side view of the apparatus in accordance with the present invention which is partially broken away and sectioned.

As illustrated in FIG. 1 of the drawing, the apparatus of the present invention comprises fluid distribution means 3 mounted on the terminus of fluid entry means 1 which passes through a first side wall 8 of separator vessel 2 and a second side wall 5 of vertical pipe 10.

The fluid distribution means 3 is preferably provided with a plurality of openings 4 disposed therethrough. Openings 4 may comprise holes, slots or the like, and are preferably oriented to distribute fluids in a horizontal or generally downward direction. The cross-sectional area of openings 4 in fluid distribution means 3 is sufficient with respect to the cross-sectional area of fluid entry means 1, to reduce the kinetic energy of the fluid entering the separation zone to improve the gravitational separation of the contained fluid of lower density from the contained fluid of higher density. The cross-sectional area of the opening or openings 4 in fluid distribution means 3 is preferably greater than the crosssectional area of fluid entry means 1 in order to enhance coalescence and to minimize the velocity of the entering fluids.

The lower extremity of vertical pipe 10 is an elongated chamber having imperforate sides which encompasses and is in fluid communication with fluid distribution means 3. An intermediate portion of vertical pipe 10 is an elongated chamber having imperforate sides and having disposed therein packing means 7 which is held in position by lower support means 15 and upper support means 16. The upper extremity of vertical pipe 10 is a slotted chamber 6 having vertical slots 14 which chamber is in fluid communication with packing means 7 and separator vessel interior 11. The top of vertical pipe 10 is capped with imperforate upper end plate 9 which enables the fluid flow to be altered to a generally horizontal direction. Separator vessel interior 11 serves as a passageway to conduct low density fluid emanating from slotted chamber 6 through vertical slots 14 to first outlet port 13 and to conduct high density fluid emanating from slotted chamber 6 through vertical slots 14 to second outlet port 12. Firt outlet port 13 is incorporated with a filtering means 17 and second outlet port 12 is incorporated with filtering means 18. Filtering means 17 and filtering means 18 serve to prevent the undesirable migration of packing means 7 from separator vessel interior 11 in the unlikely event of an unintentional passage of packing means 7 through vertical slots 14 into separator vessel interior 11 and may include a suitably sized screen or the like to provide the desired result of filtering.

Packing means 7 may include metal mesh, de-mister pads, pall rings, raschig rings or the like. Packing means 7 is operatively maintained in position within vertical pipe 10 by lower support means 15 and by upper support means 16 which may be interconnecting metal webs, wire screening, expanded metal mesh or the like which permits the unrestricted vertical flow of fluids. In the event packing means 7 is self-positioning or self-supporting, support means 15 and/or 16 may therefore be unnecessary.

In some applications, it may be preferable that packing means 7 not only occupy at least a portion of the intermediate portion of vertical pipe 10, but also at least a portion of slotted chamber 6. Of course, it is recognized in that case the design of vertical slots 14 must necessarily prevent the migration of packing means 7 from slotted chamber 6.

In continuous operation utilizing the apparatus of the present invention, a mixture of fluids having different densities is introduced through fluid entry means 1 and through fluid distribution means 3. The distributed fluids having a reduced kinetic energy flow vertically upward through packing means 7 in order to coalesce the fluids into their respective phases. After the coalesced fluids pass through packing means 7, the direction of fluid flow is altered to a generally horizontal flow and the fluid phases pass through vertically slotted chamber 6 to ensure complete coalescence without increasing the velocity of the separate fluid phases. Within separator vessel interior 11, the fluid of lower density rises to the upper region of the vessel and exits via first outlet port 13 while the fluid of higher density settles to the lower region of the vessel and exits via second outlet port 12.

The number and total cross sectional area of apertures 4 provide the required distribution of fluids. The streams of fluid leaving apertures 4 are dispersed by passing vertically through packing means 7 and then generally horizontally through slotted chamber 6 via vertical slots 14 into the fluid already contained within separator vessel interior 11.

Slotted chamber 6 preferably comprises a multiplicity of vertically oriented slots 14 which may be provided by cutting or inserting perforations into a solid wall of an imperforate chamber. Alternatively, slots 14 may be provided by employing a slotted screen which may be constructed by arranging and supporting a multiplicity of spaced apart elements which thereby define the required slots 14. Although slots 14 may be arranged in a horizontal manner in accordance with the present invention, it is preferred that a vertical orientation be used for best results. The slots 14 are preferably provided in a generally parallel relationship to each other and have a width, i.e., the length of the minor axis, from about 0.1 mm to about 50 mm. The length of the major axis of slots 14 is greater than the width and may preferably by any convenient dimension which thereby provides the required cross-sectional area of all the slots to ensure complete coalescence without increasing the velocity of the separate fluid phases. For purposes of design, it is preferable that the total cross-sectional area of slots 14 be equal to or greater than the available flowing cross-sectional area of packing means 7 to ensure no increase in fluid velocity and to improve the gravitational separation of fluids. For purposes of uniform distribution, it is preferred that the number of slots 14 is greater than about 10 and more preferably greater than about 20.

Figure 2:
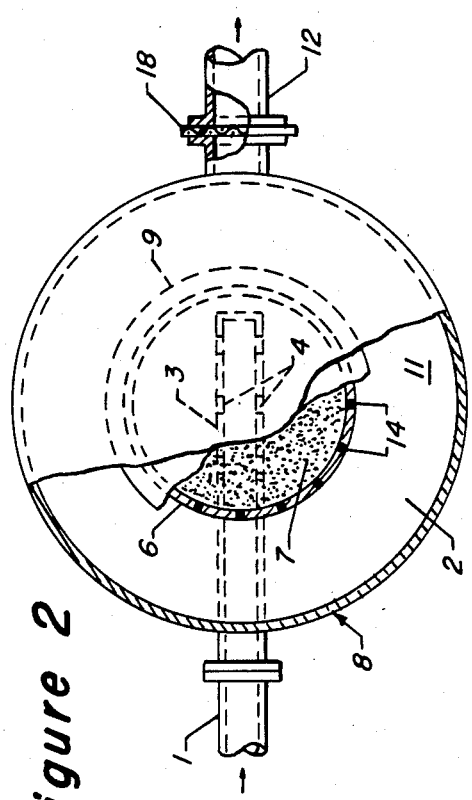
FIG. 2 is a partially broken away and sectioned view taken on line 2—2 of FIG. 1 looking down from the upper portion of the apparatus for improving the separation of fluids of different densities.

FIG. 2 is a partially broken away and sectional view taken on line 2—2 and particularly illustrates imperforate end plate 9 and slotted chamber 6 having vertical slots 14. The separator vessel interior 11 is clearly shown and it is apparent that the fluid of higher density flows in a generally horizontal direction through vertical slots 14, through separator vessel interior 11 and exits separator vessel 2 via second outlet port 12 which is associated with filtering means 18. The fluid entry means 1 passes fluids having different densities through first side wall 8 and into fluid distribution means 3. The fluids are then passed through a plurality of openings 4, packing means 7 and finally through vertical slots 14.

Figure 3:
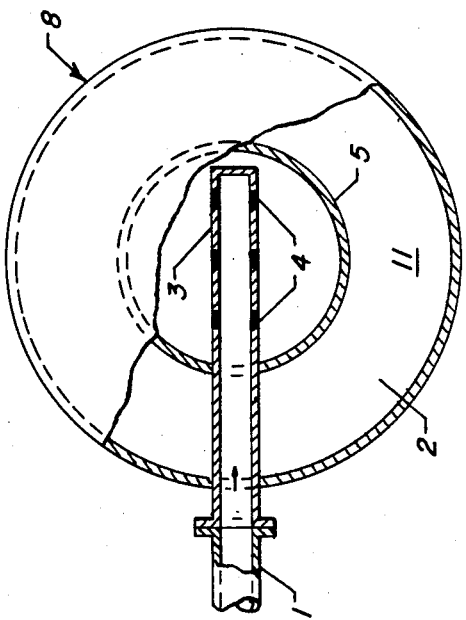
FIG. 3 is a partially broken away and sectioned view taken on line 3—3 of FIG. 1 looking down at a cut made through the center line of the fluid distribution means.

FIG. 3 is a partially broken away and sectional view taken on line 3—3 and particularly illustrates fluid distribution means 3 together with its plurality of openings 4 in relation to fluid entry means 1, second side wall 5, first side wall 8 of separator vessel 2 and separator vessel interior 11.

The design of the separation apparatus of the present invention ensures a minimum of fluid turbulence and clean, sharp gravitational separation of the fluid of lower density from the fluid of higher density.

The fluid separation system of the present invention is of particular advantage with respect to the separation of disulfide oils from caustic streams employed in a process for the extraction of mercaptans from hydrocarbon streams. The extraction of mercaptans is described in basic reference sources such as Volume 25 of the second edition of the *Kirk-Othmer Encyclopedia of Chemical Technology*. This reference shows the basic mercaptan extraction process in which a hydrocarbon feed stream is passed through an extraction column counter current to a descending stream of lean aqueous alkaline normally referred to in the art as caustic. The treated product is removed from the top of the extraction column. A mercaptan-containing caustic solution referred to as a "rich" caustic solution is removed from the bottom of the extraction column and passed into an oxidation zone in admixture with air. An oxidation catalyst dissolved in the caustic solution promotes the oxidation of the extracted mercaptans to disulfide compounds within the oxidation zone. The effluent stream of the oxidation zone is passed into a phase separation vessel from which the disulfide compounds are decanted. This procedure serves to remove the mercaptan compounds from the rich caustic stream and is therefore referred to as "regeneration" of the caustic. The resultant "lean" caustic is removed from the separation vessel and recycled to the extraction column. A more detailed description of a modern mercaptan extraction process is provided in U.S. Pat. No. 4,404,098 issued to G. S. Asdigian.

It is known to those skilled in the art that a good separation of the disulfide compounds from the caustic solution is required in order to minimize the content of disulfides in the caustic being recirculated to the extraction zone. The disulfide oils are soluble in hydrocarbon streams. Therefore, disulfide compounds present in the regenerated caustic being fed to the top of the extraction column will become dissolved in the hydrocarbon stream which is being treated. This will raise the sulfur content of the treated hydrocarbon stream and may be totally unacceptable. It is known in the art to counteract this effect by removing disulfide compounds from the regenerated caustic. The regenerated caustic or regenerated aqueous alkaline solution may therefore be processed as in U.S. Pat. No. 2,921,020 issued to P. Urban et al which described the use of a disulfide removal zone 26. In this zone, the regenerated caustic is contacted with a hydrocarbon distillate such as pentane or hexane. The caustic solution is then passed into the extraction zone.

Although the trace quantites of disulfide oil are removed from regenerated caustic by contacting with hydrocarbon distillate, there is, however, a disadvantage in that the hydrocarbon distillate has now become contaminated with disulfide oil. Therefore, the utilization of the apparatus of the present invention to remove disulfide oil from regenerated caustic during a first and/or second stage separation is highly desirable.

In the case where disulfide oil is to be removed from caustic, packing means 7 which demonstrates an ability to be preferentially wetted by the disulfide oil phase is preferably selected. A preferred packing means is a finely divided carbonaceous material such as carbon particles or activated charcoal particles for example.

In another embodiment of the present invention, the separation apparatus is also of particular advantage with respect to the separation of hydrocarbon fractions, such as, naphtha from caustic streams.

The present invention is further demonstrated by the following illustrative embodiment. This illustrative embodiment is, however, not presented to unduly limit this invention, but to further illustrate the arrangement and design details of the hereinabove described preferred embodiment. The following description is considered prospective and reasonably illustrative of the expected design of the invention.

ILLUSTRATIVE EMBODIMENT

In a commercially designed apparatus for the separation of disulfide oil compounds entrained in a regenerated caustic, a vertical cylindrical outer vessel is employed having a diameter of 2 meters and a length or height of 5 meters. The fluid inlet pipe diameter is 15 cm and the fluid distributor is a single 15 cm diameter horizontal pipe approximately 1 meter in length and having 14 evenly spaced circular holes of 5 cm in diameter positioned to provide a well-distributed fluid flow pattern in an initially horizontal position. The cross-sectional area of the circular distributor holes is greater than that of the fluid inlet pipe. The fluid distributor is housed in the lower end of an imperforate chamber which is a cylindrical pipe having a diameter of 1 meter and a length of 2 meters and rest son the bottom of the outer vessel. A 1 meter bed of packing comprising finely divided carbon particles is supported in the upper portion of the imperforate chamber. Directly above the imperforate chamber is positioned a slotted chamber having a diameter of 1 meter and a length of 1.5 meters. The slotted chamber contains 200 evenly-spaced, vertical slots having a width of 4 mm and a length of 1.2 meters. The total cross-sectional area of the slots is greater than the available flowing cross-sectional area of the bed of finely divided carbon particles. The highest density fluid or caustic is removed from the outer vessel via a 15 cm diameter outlet pipe while the lowest density fluid or disulfide oil compounds is removed from the top of the outer vessel via a 10 cm diameter outlet pipe.

The foregoing description, illustrative embodiment and drawing clearly illustrate the advantages encompassed by the apparatus and process of the present invention and the benefits to be afforded with the use thereof.

We claim as our invention:

1. A separation apparatus for improving the gravitational separation of fluids having different densities, said apparatus comprising:
   (a) a separator vessel;
   (b) a fluid entry means connected to an opening into said separator vessel;
   (c) a fluid distribution means mounted upon the terminus of said fluid entry means within said separator vessel;
   (d) said fluid distribution means including at least one aperture whereby said fluids are dispersed within said separator vessel;
   (e) an elongated chamber which is vertically oriented and having imperforate sides and bottom, and encompasses and is in fluid communication with said fluid distribution means;
   (f) a slotted chamber which is coextensive and in fluid communication with an upper end of said elongated chamber;
   (g) said slotted chamber having an imperforate upper end plate; and
   (h) packing means disposed in at least a portion of said elongated chamber, the cross-sectional area of slots of said slotted chamber being sufficient with respect to the available flowing cross-sectional area of the resulting packed bed of said elongated chamber, to prevent an increase in the velocity of said fluids to improve the gravitational separation of said fluids having different densities.

2. The separation apparatus of claim 1 wherein said fluid entry means is a cylindrical pipe.

3. The separation apparatus of claim 1 wherein said elongated chamber is cylindrical.

4. The separation apparatus of claim 1 wherein said slotted chamber is cylindrical.

5. The separation apparatus of claim 1 wherein said packing means comprises metal mesh.

6. The separation apparatus of claim 1 wherein said packing means comprises finely divided carbon particles.

7. The separation apparatus of claim 1 wherein said slots possess a parallel, vertical orientation.

8. The separation apparatus of claim 1 wherein said slots possess a width from about 0.1 mm to about 50 mm.

9. The separation apparatus of claim 1 wherein the total cross-sectional area of said slots is equal to or greater than the available flowing cross-sectional area of said packed bed.

10. The separation apparatus of claim 1 which comprises at least two fluid withdrawal means.

11. The separation apparatus of claim 10 wherein said withdrawal means comprises a filtering means.

12. A process for gravitationally separating fluids having different densities wherein said fluids are passed to a separation apparatus comprising;
   (a) a separator vessel;
   (b) a fluid entry means connected to an opening into said separator vessel;
   (c) a fluid distribution means mounted upon the terminus of said fluid entry means within said separator vessel;
   (d) said fluid distribution means including at least one aperture whereby said fluids are dispersed within said separator vessel;
   (e) an elongated chamber which is vertically oriented and having imperforate sides and bottom, and encompasses and is in fluid communication with said fluid distribution means;
   (f) a slotted chamber which is coextensive and in fluid communication with an upper end of said elongated chamber;
   (g) said slotted chamber having an imperforate upper end plate; and
   (h) packing means disposed in at least a portion of said elongated chamber, the cross-sectional area of slots of said slotted chamber being sufficient with respect to the available flowing cross-sectional area of the resulting packed bed of said elongated chamber, to prevent an increase in the velocity of said fluids to improve the gravitational separation of said fluids having different densities.

13. The process of claim 12 wherein said fluids having different densities comprise a disulfide oil and an aqueous alkaline solution.

14. The process of claim 12 wherein said fluids having different densities comprise naphtha and an aqueous alkaline solution.

15. The process of claim 10 wherein said packing means comprises finely divided carbon particles.

16. A method of gravitationally separating an admixture of naphtha and an aqueous alkaline solution which method comprises the steps of:
 (a) passing said admixture of naphtha and an aqueous alkaline solution into a separation zone;
 (b) distributing said admixture to provide a generally upflowing vertical stream of said admixture having a reduced velocity;
 (c) contacting said upflowing stream with a bed of packing wherein separate fluid phases of naphtha and aqueous alkaline solution are coalesced;
 (d) altering the direction of flow of said separate fluid phases of naphtha and aqueous alkaline solution to a generally horizontal flow;
 (e) passing said separate fluid phases of naphtha and aqueous alkaline solution through slotted apertures having a combined cross-sectional area sufficient to ensure complete coalescence without increasing the velocity of said separate fluid phases of naphtha and aqueous alkaline solution; and
 (f) recovering said separate fluid phases of naphtha and aqueous alkaline solution.

17. The process of claim 16 wherein said bed of packing comprises divided carbon particles.

* * * * *